July 9, 1963 J. P. FRANCIS 3,097,014
ADJUSTABLE WINDSHIELD AWNING AND SUPPORTING MEANS THEREFOR
Filed July 3, 1961

INVENTOR
John P. Francis

United States Patent Office 3,097,014
Patented July 9, 1963

3,097,014
ADJUSTABLE WINDSHIELD AWNING AND SUPPORTING MEANS THEREFOR
John P. Francis, 20 Boston St., Haverhill, Mass.
Filed July 3, 1961, Ser. No. 123,606
2 Claims. (Cl. 296—95)

This invention relates to improvements in windshield awnings and the supporting means for supporting the said awning, an object thereof being to provide a simple and an improved awning structure adapted to engage the exterior lateral portion of the roof top of an automobile in either spaced apart or in frictional rain sealing engagement therewith.

Another object thereof is to provide a permanent, semi-permanent, or a temporary and removable knockdown supporting structure for supporting an awning for partial or full retraction when not adjustably extended for use over the windshield area, or easily and quickly removed from the roof top in whole or in part, and disassembled in a like manner for stowage within the vehicle.

A still further and important object thereof is to provide protection to the windshield area from rain, sleet, snow, or the formation of ice thereon and to provide clean and clear visibility for proper vision at all times when viewing outdoor movies at drive-in theatres and other outdoor events, thus eliminating the continuous or the on and off use of the windshield wipers.

With these objects and still others in view, as will hereinafter more fully appear, the invention comprises certain novel constructions, combination and arrangement of parts, hereinafter described and claimed and illustrated in the accompanying drawings, in which:

Figure 1:
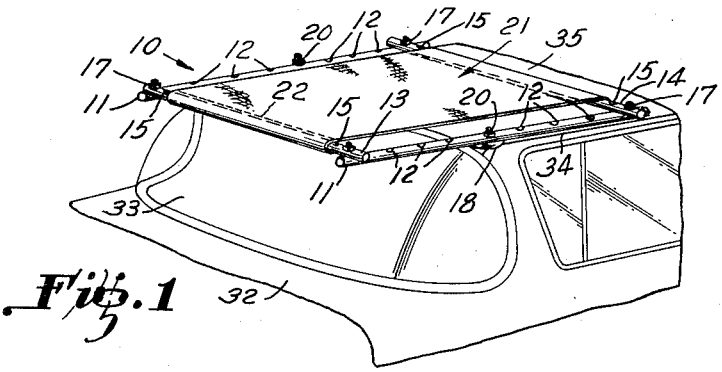
FIGURE 1 is a perspective view, in fragment, of the front portion of an automobile, the view including a perspective view of the awning and the supporting structure shown supported over the roof top.
Figure 2:
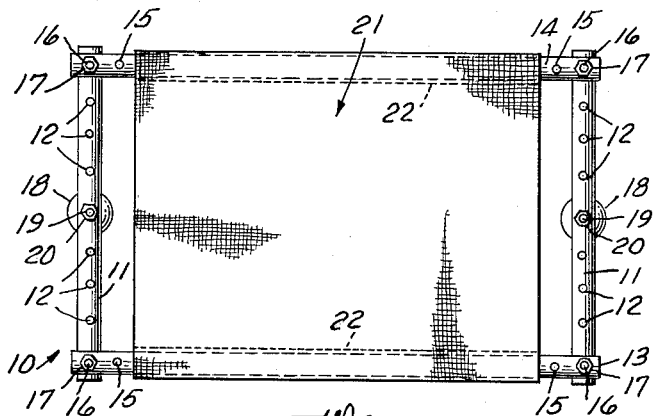
FIGURE 2 is a top plan view of the awning, which is longitudinally narrower than the frame structure, shown attached to the lateral cross members of the frame structure.
Figure 5:
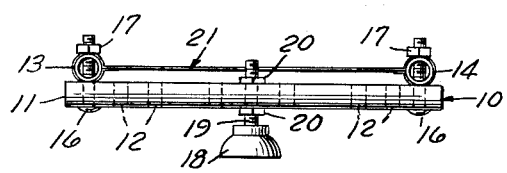
FIGURE 5 is a side elevation view of the awning structure, as shown in FIGURE 2.

Referring now more specifically to the drawings, attention is directed to FIGURES 1, 2 and 5, wherein numeral 10 generally indicates the frame structure and numeral 21 generally indicates the awning structure.

In FIGURE 1, a portion of an automobile 32 is shown, with the awning structure 21 supported by the frame structure 10 above the roof top 35 and over the windshield area 33, supported in either adjustable vertical spaced apart relationship or in frictional rain sealing engagement with the lateral portion of said roof top.

Figure 3:
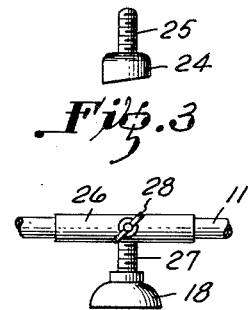
FIGURE 3 is an end elevation view, of a modified form of roof engaging means, in the form of a magnetized metal base member.
Figure 6:
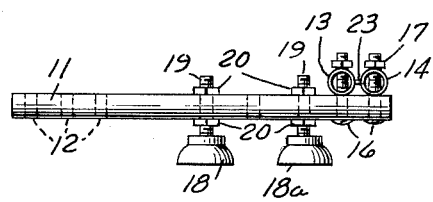
FIGURE 6 is also a side elevation view of the awning structure, in a modified form, with additional roof engaging means and with the awning in fully retracted position.

To support the awning structure 21, first, roof engaging means in the form of vacuum cups 18 and 18a are either removably or permanently attached to the roof top 35 at the desired location, longitudinally and laterally, as may be seen from FIGURE 1, and also FIGURES 2, 5 and 6. The modified form of roof engaging means, FIGURE 3, in the form of a magnetized metal base member 24 having a vertical threaded member 25 threadably attached thereto, may be used in place of the vacuum cups 18 or 18a.

Figure 4:
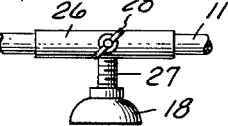
FIGURE 4 is a side elevation view, of a modified form of supporting a frame structure, having a tubular longitudinal supporting member attached to roof engaging means.

Attached to the roof engaging means 18 or 24, are the vertical threaded members 19 and 25 respectively, adapted to adjustably engage the vertical apertures 12 in the side longitudinal frame members 11 of the frame structure 10. In FIGURE 4, a vertical threaded member 27 is shown attached to a longitudinal tubular support 26 having a thumb screw 28 for adjustably supporting the side longitudinal frame member 11 of said frame structure 10.

Roof engaging means and a variation of a frame and awning structure are shown and described in my copending application Serial No. 70,100, filed November 15, 1960. My invention therefore, is concerned primarily with a modified form of frame structure and awning, with modified means of supporting the said frame structure and awning.

In FIGURE 2, there is shown the frame structure 10 comprising; the two longitudinal side spaced members 11 each having a series of vertical apertures 12, the forward lateral member 13, and the rear lateral member 14, both of said lateral members having vertical apertures 15. The four frame members 11, 13 and 14, are removably and adjustably attached together by the threaded bolt means 16 and locknut 17, or other suitable fastening means. The threaded bolt 16 engages the vertical apertures 12 and 15 of the frame members 11, 13 and 14, the apertures being threaded or non-threaded, as desired, for the reception of each bolt member 16 through said apertures.

The awning or panel structure 21 is provided with a forward and a rear lateral hem 22, or other suitable means for attachment, to engage the two removably attached lateral frame members 13 and 14. The awning 21 is therefore supported as a fully retractable taut supported awning panel upon the retractable movement of the frame structure 10 attached to the roof engaging means 18 or 24, or adjustably retractable or extendable upon the adjustable movement of either one or both of the lateral frame members 13 and 14 of frame structure 10. The awning 21, constructed preferably of flexible material, is narrower in lateral width than the side spaced apart longitudinal frame members 11, and provides a fully retractable taut supported or collapsible awning structure.

In FIGURE 5, there is shown a side elevation view of the awning and frame structure of FIGURE 2. The vacuum cup 18 is provided with a threaded vertical member 19 which engages one of the vertical apertures 12 of the side frame member 11. Attached to the threaded member 19 are the adjustable nut members 20, one above and one below the frame member 11 for the vertical height adjustment of the frame structure 10. A threaded bolt 16 may be used without the nut 17 when engaging the threads of the apertures 12 and 15 of the frame members 11, 13 and 14. Attached to the lateral frame members 13 and 14 is the awning structure 21, shown in a taut supported form.

In FIGURE 6, a modified side elevation view, there is shown the awning 21 in a fully collapsed retracted position as at 23, with the forward lateral frame member 13 adjustably attached to a rear aperture 12 of frame member 11. The forward lateral frame member 13 has the flexible awning 21 coiled thereto, or the awning 21 may be coiled around the rear lateral frame member 14, as desired, when collapsed for full retraction or stowage thereof upon the roof top 35 of the automobile 32. Also shown, is the additional vacuum cup 18a for providing additional support and mainly for longitudinally angular adjustment of the frame structure 10.

Figure 7:
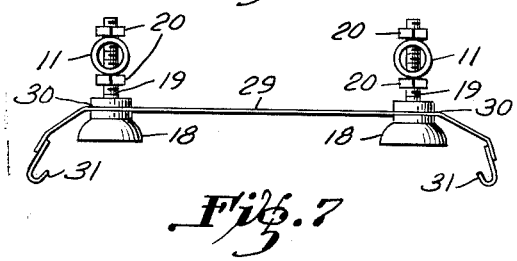
FIGURE 7 is a front elevation view, of the awning structure without the lateral cross members and awning, showing the means for securing the vacuum cups to the roof.

Referring to FIGURE 7, which is a front elevation view showing the device without the lateral frame members 13 or 14 and the awning 21, there is shown well known securing means for securing vacuum cups onto the roof top of a vehicle. A lateral band or strap member 29 is provided with apertures as at 30, to engage the upper portion of the vacuum cups 18. Attached at each end of the band 29 are gutter engaging hooks 31 adapted to engage the rain gutters 34 of an automobile 32, for permanent attachment of the vacuum cups 18 to the roof top of the automobile.

The awning may be supported in adjustable spaced relation relative to the lateral portion of the roof top, or in rain sealing engagement, or in friction supporting engagement therewith. Vertical height adjustment or the longitudinally angular adjustment of the frame structure 10 above the roof top 35; and the vertical location of the lateral frame members 13 and 14 attached either above, below, or one above and one below the side longitudinal frame members 11, governs the manner in which the awning 21 may be supported relative to the roof top of the vehicle.

To retract the taut supported awning or panel 21, in a taut supported form, the frame structure 10 is removed from the vertical threaded members 19 and relocated in the desired vertical aperture 12 of side frame members 11. In the modified form, of FIGURE 4, the longitudinal frame member 11 is adjustably retracted through the tubular longitudinal support 26 attached to the vertical member 27. The awning 21 is also retracted or extended, in a collapsible form, upon the adjustable movement of lateral frame members 13 or 14, or both.

The simplicity in the structure and operation of the device; the extreme simplicity in the ease and safety in the erection, stowage, or removal; and combined with the extreme viewing pleasure and comfort; these objects all enjoyed and benefited by both management and the patrons during inclement weather conditions, while viewing outdoor movies or the like.

While certain embodiments of my invention have been disclosed in the foregoing description, it will be understood that various modifications may occur to those skilled in the art. Changes, therefore, in the construction and arrangement, may be made without departing from the spirit and the scope of the invention as disclosed in the appended claims.

I claim:

1. An adjustable taut supported rain awning structure adjustably supported over the roof top and windshield area of an automobile comprising, a longitudinally adjustable rectangular shaped frame structure, said frame structure having longitudinally extending laterally spaced apart tubular frame members each provided with longitudinally spaced apart vertical apertures, forward and rear laterally directed and longitudinally spaced movable tubular frame members, means detachably connecting said laterally directed members to said longitudinally extending members comprising longitudinally spaced apart threaded bolt members, said bolt members extending upwardly through the vertical apertures in said frame members, removable threaded frame clamping members on said bolt members, both of said movable laterally directed frame members adapted to be removably attached onto the upper side of the outer periphery of the said side longitudinally extending frame members upon engagement of the said bolt members, laterally spaced apart frame support means, said support means comprising roof engaging means, a vertically disposed threaded stud member attached to each of said roof engaging means, vertically adjustable threaded frame engaging means on said stud members, said stud members adapted to freely engage the vertical apertures of the said longitudinally extending frame members of said frame structure to provide for longitudinal positioning of the said frame structure, the said frame engaging means on said stud members adapted to freely engage the underside of the said frame structure and to adjustably support said frame structure in vertically spaced apart relationship relative to the roof top, and a flexible taut supported rain awning panel adjustably coiled around said laterally directed frame members, said awning being movably supported in longitudinally and in vertically spaced apart relationship relative to the said side longitudinally extending frame members of said frame structure, said taut supported awning adapted to be retracted and extended in the said taut supported form upon the removal of one of the said laterally directed frame members and the manual coiling thereof, the said laterally directed frame members thereby defining the longitudinal length and also determining the longitudinal position of the said taut supported rain awning panel relative to the said side longitudinally extending frame members.

2. An adjustable taut supported rain awning structure adjustably supported over the roof top and windshield area of an automobile comprising, a longitudinally adjustable rectangular shaped frame structure, said frame structure having longitudinally extending laterally spaced apart tubular frame members each provided with longitudinally spaced apart vertical apertures, forward and rear laterally directed and longitudinally spaced movable tubular frame members, means detachably connecting said laterally directed members to said longitudinally extending members comprising longitudinally spaced apart threaded bolt members, said bolt members extending upwardly through the vertical apertures in said frame members, removable threaded frame clamping members on said bolt members, both of said movable laterally directed frame members adapted to be removably attached onto the upper side of the outer periphery of the said side longitudinally extending frame members upon engagement of the said bolt members, laterally and longitudinally spaced apart frame support means, said support means comprising roof engaging means, a vertically disposed threaded stud member attached to each of said roof engaging means, vertically adjustable threaded frame engaging means on said stud members, said stud members adapted to freely engage the vertical apertures of the said longitudinally extending frame members of said frame structure to provide for longitudinal positioning of the said frame structure, the said frame engaging means on said stud members adapted to freely engage the underside of the said frame structure and to adjustably support said frame structure in vertically and longitudinally angular spaced apart relationship relative to the roof top, and a flexible taut supported rain awning panel adjustably coiled around said laterally directed frame members, said awning being movably supported in longitudinally and in vertically spaced apart relationship relative to the said side longitudinally extending frame members of said frame structure, said taut supported awning adapted to be retracted and extended in the said taut supported form upon the removal of one of the said laterally directed frame members and the manual coiling thereof, the said laterally directed frame members thereby defining the longitudinal length and also determining the longitudinal position of the said taut supported rain awning panel relative to the said side longitudinally extending frame members.

References Cited in the file of this patent

UNITED STATES PATENTS

| | | |
|---|---|---|
| 520,690 | Kuehn | May 29, 1894 |
| 1,239,877 | Bush | Sept. 11, 1917 |
| 2,496,085 | Engelhart | Jan. 31, 1950 |
| 2,984,300 | Francis | May 16, 1961 |